(12) United States Patent  
Kaneshiro et al.

(10) Patent No.: US 7,583,398 B2  
(45) Date of Patent: Sep. 1, 2009

(54) PRINTING METHOD AND SYSTEM

(75) Inventors: Sally Kaneshiro, Corvallis, OR (US); David Pettigrew, Corvallis, OR (US); Paul J. McClellan, Bend, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 860 days.

(21) Appl. No.: 11/133,636

(22) Filed: May 20, 2005

(65) Prior Publication Data

US 2006/0262334 A1 Nov. 23, 2006

(51) Int. Cl.
  G06F 15/00 (2006.01)
  G06F 15/177 (2006.01)
(52) U.S. Cl. ..................... 358/1.15; 709/221
(58) Field of Classification Search ................ 358/1.15, 358/1.13, 1.14, 1.18, 1.16, 1.8, 473, 3.01; 709/203, 221, 216; 700/95, 108
See application file for complete search history.

(56) References Cited

U.S. PATENT DOCUMENTS

| | | | |
|---|---|---|---|
| 5,467,434 A * | 11/1995 | Hower et al. ............... | 358/1.15 |
| 6,538,763 B1 | 3/2003 | Klosterman et al. | |
| 6,652,169 B2 | 11/2003 | Parry | |
| 6,681,392 B1 | 1/2004 | Henry et al. | |
| 6,778,205 B2 | 8/2004 | Anderson et al. | |
| 2002/0067504 A1 | 6/2002 | Salgado et al. | |
| 2002/0140966 A1 | 10/2002 | Meade, II et al. | |
| 2003/0020938 A1 | 1/2003 | Terada et al. | |
| 2003/0053103 A1 | 3/2003 | Patton | |
| 2003/0063305 A1 | 4/2003 | McIntyre | |
| 2003/0090704 A1 | 5/2003 | Hansen | |
| 2003/0108708 A1 | 6/2003 | Anderson et al. | |
| 2003/0117639 A1* | 6/2003 | Milton et al. ............... | 358/1.13 |
| 2003/0137681 A1 | 7/2003 | Yamamura et al. | |
| 2003/0142351 A1 | 7/2003 | Sakura | |
| 2003/0184784 A1 | 10/2003 | Ferlitsch | |
| 2004/0085563 A1 | 5/2004 | Nishimura | |
| 2004/0120001 A1 | 6/2004 | Boldon | |
| 2004/0184063 A1 | 9/2004 | Baldwin | |

* cited by examiner

*Primary Examiner*—Saeid Ebrahimi Dehkordy (57) ABSTRACT

A printing method includes providing a device with access to configuration data that can be changed without recompiling printing system software that is used by the device, in conjunction with the configuration data, to perform a printing operation.

40 Claims, 4 Drawing Sheets

MEDIA-SPECIFIC DATA FILES

FIG. 4B

DEVICE/MEDIA-SPECIFIC DATA FILES

FIG. 4C

PRINTING METHOD AND SYSTEM

BACKGROUND

Printing systems typically contain both the printing system software and the data required to support a particular set of media types and print qualities. Both the software and the data are customized for a specific printing system. Any changes to the media types and print qualities supported require a software change and consequently require a software update.

Known printing system software compiles the printer-specific data into the software, itself. To change these parameters, it is necessary to recompile the printing system software, which in turn requires subsequent extensive testing of the possibly-altered executable instructions within the printing system software. As a result, users must obtain and reinstall a copy of the entire printing system software package.

BRIEF DESCRIPTION OF THE DRAWINGS

Detailed description of embodiments of the present disclosure will be made with reference to the accompanying drawings.

DETAILED DESCRIPTION

The following is a detailed description for carrying out embodiments of the present invention. This description is not to be taken in a limiting sense, but is made merely for the purpose of illustrating the general principles of the example embodiments of the present invention.

The present description involves methods for providing a printing apparatus with both backward and forward compatibility with respect to changes in device- and/or media-specific data used by the printer. In this description, the term "device- and/or media-specific data file" means a device-specific data file, a media-specific data file, or a device- and media-specific data file.

In an example embodiment, a printing apparatus includes a device configured to perform a printing operation using both printing system software and a configuration data file (e.g., including device- and/or media-specific data file) that configures the printing system to operate with at least one of a particular type of printing device or a particular type of print media, and a mechanism for changing the configuration data file so as to allow the printing system software to operate with at least one of a different type of printing device or a different type of print media without recompiling the printing system software. The printing operation can be, for example, a labeling operation, a direct disc labeling operation, or any other visible indicia-imparting operation. In an example embodiment, the mechanism for changing includes a memory device for storing the configuration data file, with the memory device and the printing system software being separately accessible.

Figure 1:
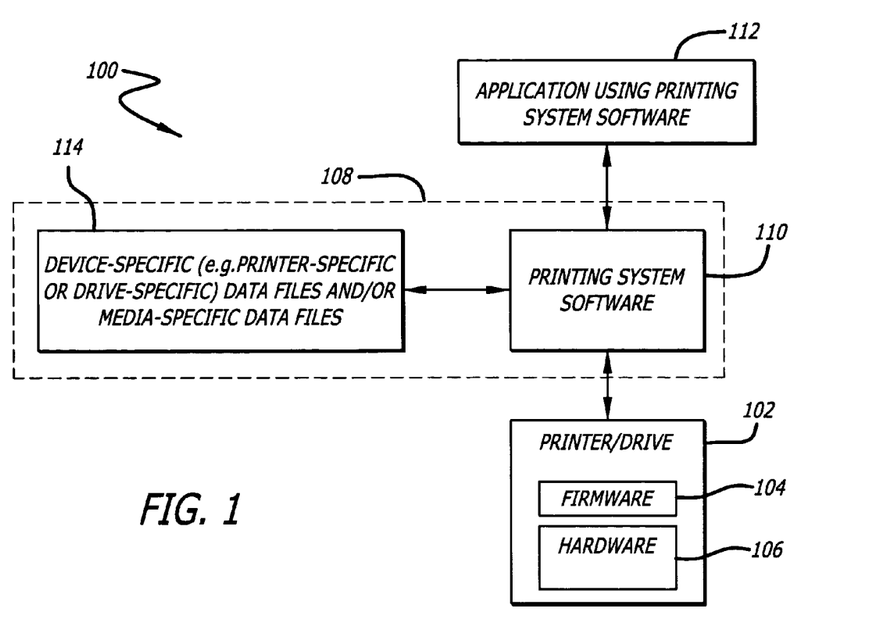
FIG. 1 illustrates an example printing system embodying backward and forward compatibility functionality according to an embodiment of the present invention.

FIG. 1 illustrates an example printing system 100 embodying backward and forward compatibility functionality. In this example embodiment, the printing system 100 includes a device 102 (e.g., a printer or drive), with firmware 104 and hardware 106, one or more memory devices 108 for storing printing system software 110, and an application 112 configured to use the printing system software 110. As used herein, the term "printing system software" includes processor-executable instructions that encode algorithms, processes, functions, etc. that receive a raster graphic image from the application 112, process the image into the print data format required by device 102, and send the processed print data to device 102 so as to cause the desired print output to be produced. However, software 110 does not include device-specific data that configures software 110 to properly communicate with device 102, nor device-, media-, or quality setting specific data than configures software 110 to properly print at a particular quality setting on a particular type of media used in device 102). The one or more memory devices 108 also include device- and/or media-specific data files 114, which are separately accessible from the printing system software 110 and which include any device-specific data that configures software 110 to properly communicate with device 102 and device-, media-, and quality setting specific data that configures software 110 to properly print at a particular quality setting on a particular type of media used in a particular device 102. By way of example, the device-specific files are printer-specific data files or drive-specific data files. It should be appreciated, however, that the principles described herein are applicable to other types of device-specific data files, as well as various types of media-specific data files.

In an example embodiment, the device- and/or media-specific data files 114 are located or stored separately from the printing system software 110. To change parameters (e.g., labeling parameters) of the data files 114 therefore requires recompiling or otherwise updating only the device- and/or media-specific data files 114, not the printing system software 110. For example, printer-specific data that does not include executable instructions can be changed separately from the printing system software 110, without requiring recompilation and retesting of the printing system software 110.

In an example embodiment, data required to support a particular device is stored separately, e.g., externally, in a device-specific data file 114. In an example embodiment, the device is a printer, and the device-specific data file 114 is a printer-specific data file. In such an embodiment, new printers, media types and/or print qualities can be supported by adding and updating the printer-specific data file only, i.e., without having to update, or recompile, the printing system software. In one example, the printer marks constituting the printed image may be placed on a raster with a resolution determined by the combination of the particular printer being used to mark a particular media type at a specified quality setting and this resolution may be specified in the printer-specific data file, indexed for that particular media type and quality setting. In another example, the marking power and rotational speed to be used by a particular disc printing system to mark a particular media type at a specified quality setting may be specified in the printer-specific data file, indexed in the same way. "Indexed" here refers to how the resolution is "physically" represented in the data file. For example, data arranged in an array A=(a1, a2, ..., aj, ..., an) is accessed through an array "index" j like this: aj=A[j]. It should be appreciated that the data can be arranged in a variety of different ways. The algorithms for printing may be the same for all printer, media type, and quality settings and only the specific data provided by the printer-specific data file is needed to support new printers, media types and/or print qualities. By adding and/or updating printer-specific data files to include such new printer, new media type, or new quality setting specific data, new printers, media types and/or print qualities can be supported without updating, or recompiling, the printing system software. In such an embodiment, the printing system software can potentially support an unlimited number of different printing systems.

In an example embodiment, a printing apparatus includes one or more storage devices in which are stored printing system software and configuration data that configures the software to print using at least one of a particular type of printing device and a particular type of print media, the one or more storage devices being configured such that the configuration data is separately accessible from the printing system software. The apparatus also includes a device configured to access the one or more storage devices and to perform a printing operation using both the printing system software and the configuration data file. In an example embodiment, the configuration data includes multiple data sets that are each compatible with a specific device, media type, or combination of device and media type. In an example of device-specific data files, the data files contain optimized printing parameters defined for a specific printer and different combinations of media types and quality settings. In an example of media-specific data files, the data files contain optimized printing parameters defined for a specific media type and different combinations of quality settings and device types. In either example using the optimized data, the printing system can produce optimal (or best possible) print quality for a given media type and print quality combination.

Figure 4A:
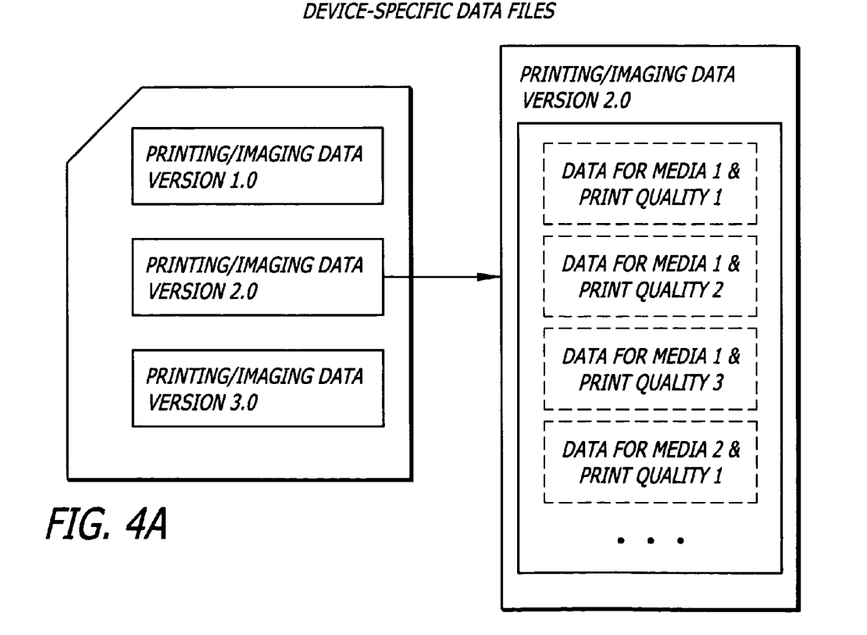
FIG. 4A shows an example organization for a device-specific data file.

FIG. 4A shows an example organization for a device-specific data file. In this example embodiment, the device-specific data file includes three versions (Versions 1.0, 2.0 and 3.0) of Printing/Imaging Data. As shown in this example, Printing/Imaging Data Version 2.0, in turn, includes data for various media type and print quality combinations.

Figure 4B:
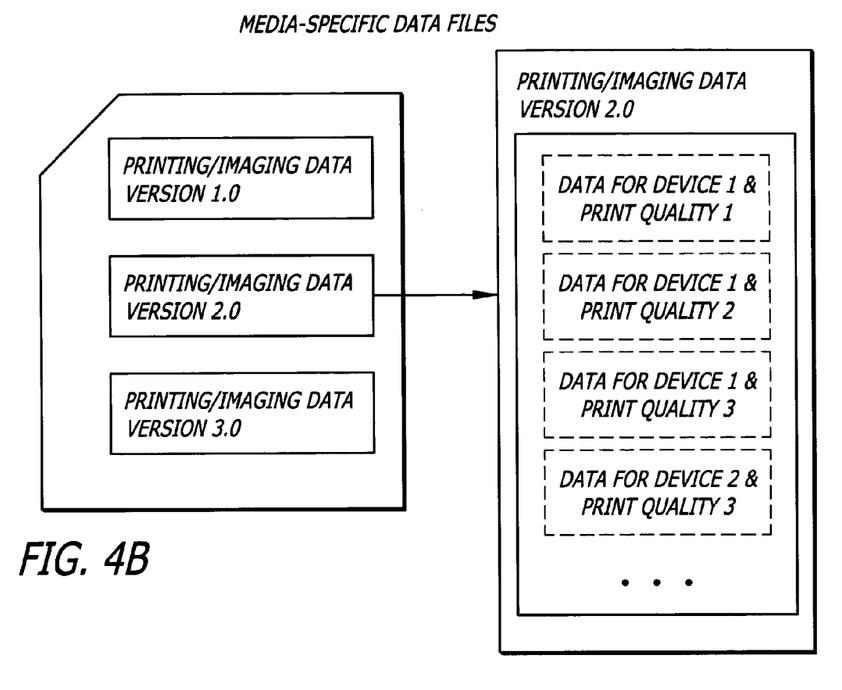
FIG. 4B shows an example organization for a media-specific data file.

FIG. 4B shows an example organization for a media-specific data file. In this example embodiment, the media-specific data file includes three versions (Versions 1.0, 2.0 and 3.0) of Printing/Imaging Data. As shown in this example, Printing/Imaging Data Version 2.0, in turn, includes data for various device type and print quality combinations.

Figure 4C:
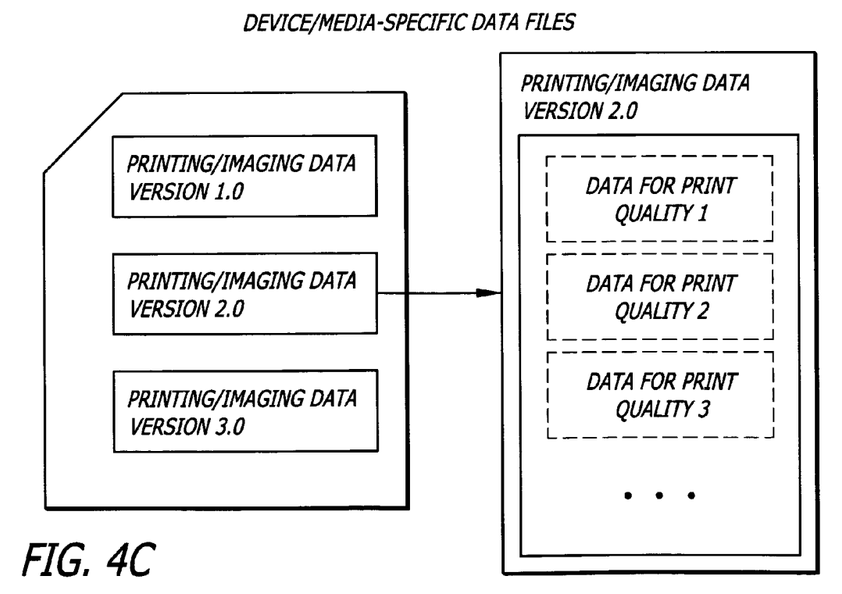
FIG. 4C shows an example organization for a device/media-specific data file.

FIG. 4C shows an example organization for a device/media-specific data file. In this example embodiment, the device/media-specific data file includes three versions (Versions 1.0, 2.0 and 3.0) of Printing/Imaging Data. As shown in this example, Printing/Imaging Data Version 2.0, in turn, includes data for different levels of print quality.

In an example embodiment, a printing method includes segregating, from processor-executable printing system software, configuration data that configures the software to print using at least one of a particular type of printing device and a particular type of print media; and providing the device (e.g., a printer or a drive) with access to the configuration data to enable the device to perform a printing operation (e.g., a labeling operation) using the software. In an example embodiment, the method further includes updating the configuration data without recompiling the printing system software. In an example embodiment, the method further includes updating the configuration data to include an additional data set that is compatible with a new device. In an example embodiment, the configuration data includes multiple data sets that are each compatible with different devices. In an example embodiment, the configuration data includes generic device data that is compatible with multiple different devices.

Figure 2:
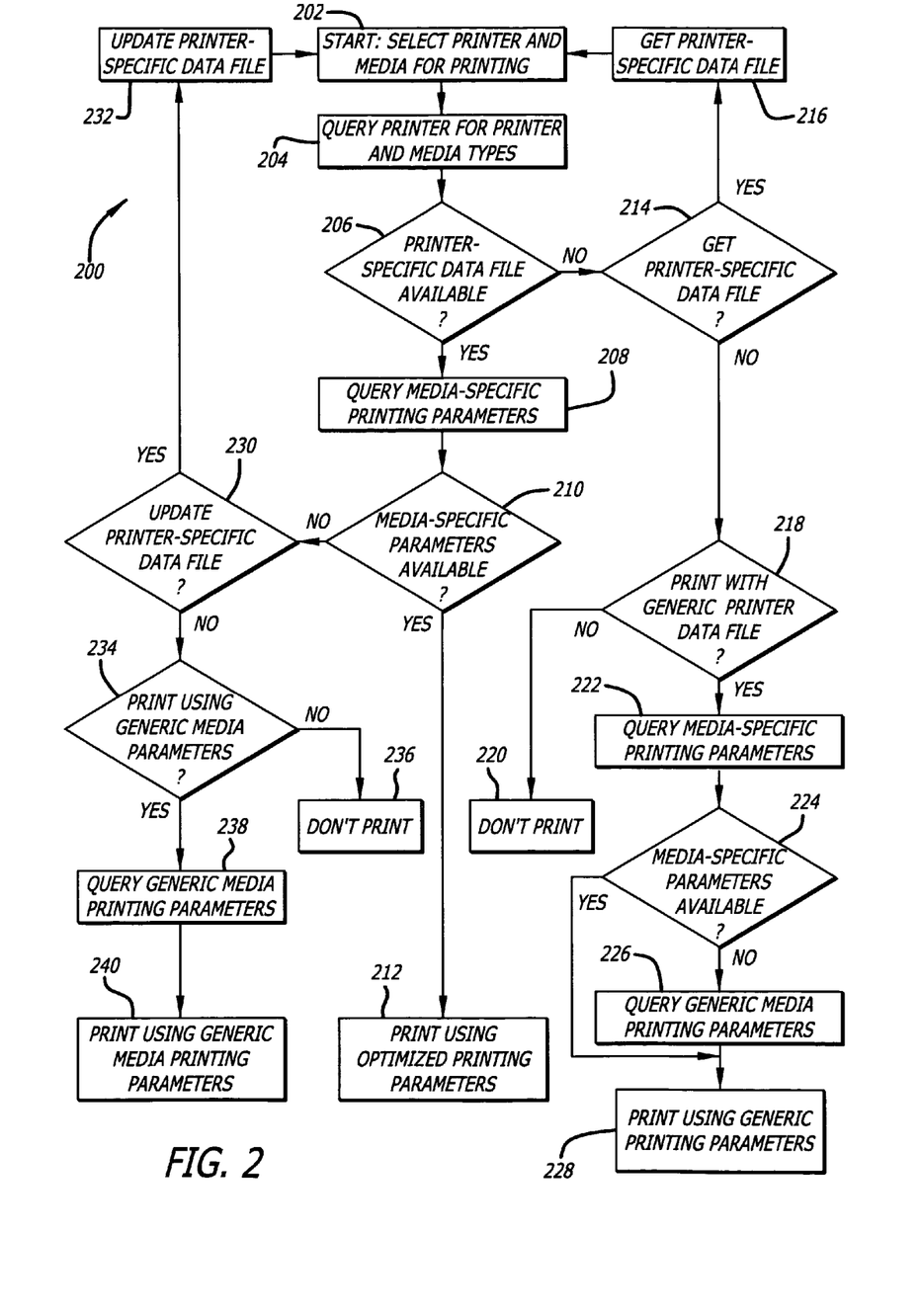
FIG. 2 is a flowchart illustrating an example method for supporting printer and media types according to an embodiment of the present invention.

Referring to FIG. 2, an example method 200 for supporting new printing devices and media types is now described. By way of example, software for implementing the method 200 can be provided as part of the printing system software. Although this example is described in reference to printing devices and printer-specific data files, it should be appreciated that this and other such methods are more generally applicable to devices and device-specific data files.

In this example embodiment, the method 200 begins at 202 when the user of the printing system selects a printer and media for printing. When the printing process begins, the printing system software obtains, at 204, the type of the printer and the type of the media currently loaded on the printer from the printer device, itself. At 206, a determination is made as to whether a printer-specific data file associated with the designated printer is available. If the determination is affirmative, the process advances to 208 where the printing system software examines the contents of the printer-specific data file to see if it contains the media-specific data (e.g., printing parameters) associated with the media type currently loaded on the printer. At 210, a determination is made as to whether media-specific parameters associated with the designated media are available. If the determination is affirmative, the process advances to 212 where the printing system prints using the printer-specific and media-specific printing parameters optimized (or otherwise selected) for the printer and media identified in 202.

If no printer-specific data file is present (the "No" branch of 206), this example method provides the printing system with two ways to support the printer and allow the printing process to continue. At 214, a decision is made whether to add a new printer-specific data file to the system. User input can be provided in making this decision, or the decision can be made automatically (e.g., depending upon the printer and/or media selected, the nature of the printing operation, or other criteria.) If the decision is made in the affirmative, at step 216, the memory device 108 is updated by adding one or more new printer-specific data files to the system, e.g., by downloading the new data files from a remote database. In an example embodiment, the new printer-specific data files provide optimized (or suitable) data for the selected printer and produce an optimal (or other designated level of) print quality. At 214, if the decision is to not add a new printer-specific data file, an existing generic printer data file can be used to obtain suboptimal (or other) results. In this example embodiment, at 218, a decision is made whether to print with a generic printer data file. User input can be provided in making this decision, or the decision can be made automatically (e.g., depending upon the printer and/or media selected, the nature of the printing operation, or other criteria.) If the decision is made in the negative, the process advances to 220 and the printing operation is terminated. If the decision is made in the affirmative, the process advances to 222 where the printing system looks for media-specific data (e.g., printing parameters) associated with the designated media. At 224, a determination is made as to whether media-specific parameters associated with the designated media are available. If the determination is negative, at 226, generic media printing parameters, always available in printer-specific data files in an example embodiment, are obtained from the generic printer data file, and then the process advances to 228 where the printing process is performed using generic printer and generic media printing parameters. At 224, if the determination is made in the affirmative, 228 is performed using generic printer parameters and media-specific parameters. Thus, according to the various embodiments described herein, the printing system software does not need to be updated or recompiled in order to support new printers.

The ability to use either printer-specific data files or the generic data files provides forward compatibility for the printing system—that is, the existing printing system software can support printers that are developed after the printing system software was released. As printers are deprecated (i.e. phased out) and are no longer supported, the printing system will still support the deprecated printers by accessing the existing printer-specific data files. If the printer-specific data files are no longer present, the generic printer data file can be used to provide backward compatibility—that is, the printing system software can support printers that were obsolete by the time that the particular version of the printing system software was released. An alternative solution to providing generic printer data files is to include the generic data in the printing solution software.

New media types can be supported by a similar strategy. In the example embodiment shown in FIG. 2, if it is determined at 210 that media-specific parameters are not available, the process advances to 230. At 230, a decision is made whether to update a printer-specific data file to attempt to obtain data that is optimized (or otherwise suitable) for the new media type. User input can be provided in making this decision, or the decision can be made automatically (e.g., depending upon the printer and/or media selected, the nature of the printing operation, or other criteria.) If the decision at 230 is made in the affirmative, the process advances to 232 where the printer-specific data file is updated. If it is decided not to update the printer-specific data file, the process advances to 234. In this example embodiment, at 234, a decision is made whether to print using generic media parameters. User input can be provided in making this decision, or the decision can be made automatically (e.g., depending upon the printer and/or media selected, the nature of the printing operation, or other criteria.) If the decision is made not to print using generic media parameters, the process advances to 236 and the printing operation is terminated. If the decision at 234 is made in the affirmative, the process advances to 238 where generic media printing parameters are obtained, and then the process advances to 240 where the printing process is performed using the generic media printing parameters. By way of example, generic media parameters or settings are typically contained in printer-specific data files. An alternative solution to providing generic media data files is to include the generic data in the printing solution software.

Thus, in this example embodiment, the printing system software provides a mechanism for selecting device-specific data or generic device data. The generic device data can be stored in the device- and/or media-specific data file. Alternately, the printing system software includes the generic device data.

Also in this example embodiment, the printing system software provides a mechanism for selecting media-specific data or generic media data. The generic media data can be stored in the device- and/or media-specific data file. Alternately, the printing system software includes the generic media data.

The ability to use either media-specific settings (e.g., optimized settings) or generic media settings provides forward compatibility for the printing system. Older media types are supported by retaining their media-specific data in the device-specific data files or by retaining the media-specific data files. As media types are deprecated, the printing system will still support the deprecated media types at a suboptimal level by using the generic media settings within the device-specific data files or by using a generic media data file. This strategy provides backward compatibility for deprecated media types.

The collection of printer parameters and media parameters used by one or more versions of printing system software may be referred to as a data set. As a printing system evolves and new versions of printing system software are released, the printer-specific data files may contain new parameters and thus the data set format may change. In an example embodiment, each data file may contain multiple data sets in order to support multiple versions of printing system software. In various example embodiments, an initial data set format will be supported in every version of the printing system software. For example, as new data is required by newer versions of printing system software and the data set format changes correspondingly, the new version of the data set will be appended to the existing data file. The printing system will then have multiple versions of the data sets available in each data file. If the printing system is unable to read the most recent data set, it can search the printer-specific data file for a data set that is compatible. This strategy provides backward compatibility and forward compatibility of data files within one data file.

Figure 3:
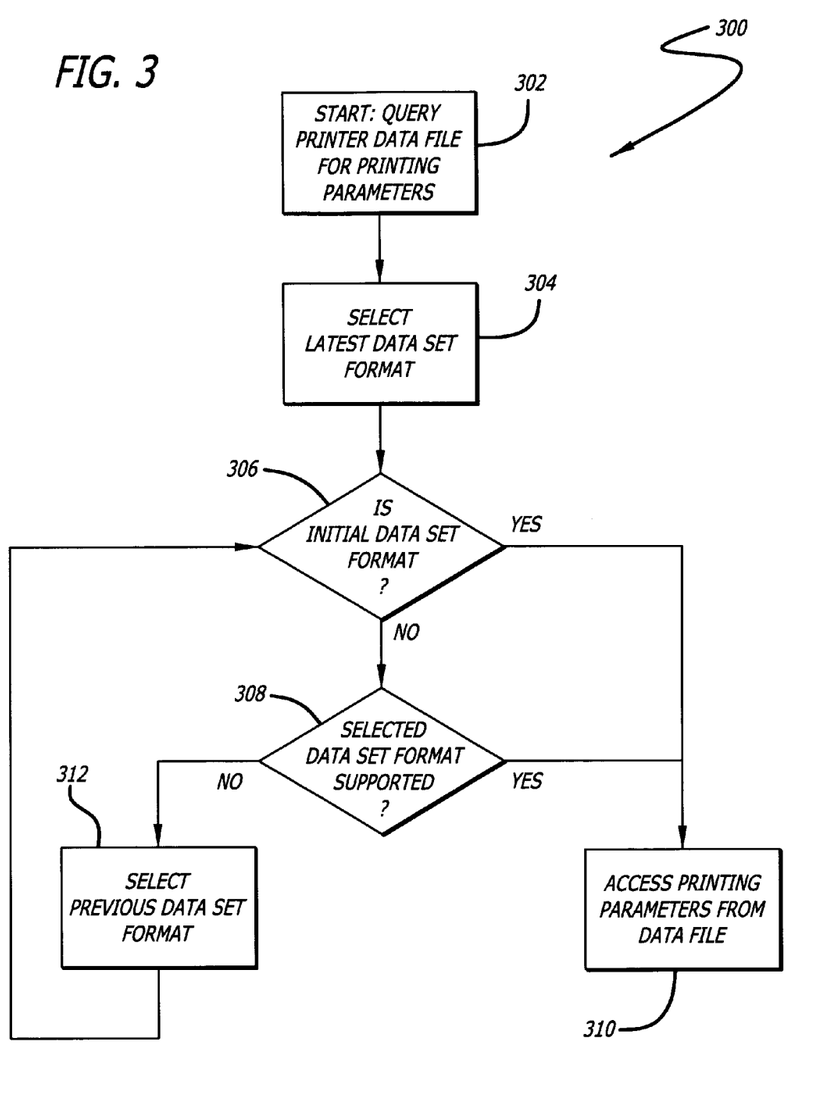
FIG. 3 is a flowchart illustrating an example method for supporting multiple printer data file formats according to an embodiment of the present invention.

FIG. 3 is a flowchart illustrating an example method 300 for supporting multiple printer data file formats. By way of example, software for implementing the method 300 can be provided as part of the printing system software. Although this example is described in reference to printer data files, it should be appreciated that this and other such methods are more generally applicable to device data files, as well as to media data files.

In this example embodiment, the method 300 begins at 302 by querying a printer data file for printing parameters. At 304, the latest data set format is selected. At 306, a determination is made whether an initial data set is the selected latest data set format. If not, the process advances to 308. At 308, a determination is made whether the selected data set format is supported by the printing system software. If the determination made at either 306 or 308 is in the affirmative, the process advances to 310 where the printing parameters are accessed from the data file. At 308, if it is determined that the selected data set format is not supported by the printing system software, then the process advances to 312 where the previous data set format is selected. This loop is repeated until a supported data set format is found.

The principles described herein can be implemented in a variety of different printing system, for example, in the LightScribe™ printing system by Hewlett-Packard Company. LightScribe is a direct disc labeling technology that produced optically visible text and graphics on the surface of a CD or DVD disc media using the disc drive's laser and a specially coated LightScribe disc. A LightScribe disc drive writes data and creates labels in the same drive, and may use the same laser for both operations. Using laser technology, LightScribe's specially coated discs chemically change when a laser strikes its label side, producing titles and graphics created using LightScribe software. One embodiment of a suitable coating is described in U.S. Patent Application Publication No. 2003/0108708 A1.

LightScribe is a direct disc labeling solution that extends the capabilities of existing drive, media and software to labeling discs. In the LightScribe system, the drive is a printing device, i.e., it is the "printer". One example of such a device is described in U.S. Pat. No. 6,778,205, which is assigned to the assignee of the present invention. In the LightScribe printing system, an example embodiment of the present invention would be to separate drive-specific, media-specific, and quality-specific data into drive-specific data files called Drive Resource Files or DRFs. Such data parameters may describe, for example, the laser power and the disc rotational speed that should be used by a particular drive to optimally label a particular type of optical disc media inserted in the drive. As described previously with respect to device- and/or media-specific data files, the DRFs provide backward support for deprecated drives and media types as well as support for new drives and media types without requiring a software update.

By way of example (an example that describes how a new drive type can be supported by the system, with or without a new DRF update), when a printing process begins, the printing system looks for the DRF associated with a specific drive type. If the DRF cannot be found, the user can either use a supplied generic DRF or request a software update to use associated DRF with optimized values. In an example embodiment, the generic DRF contains default values for the generic media type. As a result, regardless of the media type used in the drive, forward compatibility for newer drive types is provided without requiring a software update assuming that the media-specific or generic media printing parameters are usable to label any particular media type on that new drive type. If a drive type is deprecated and no longer supported, the drive can still be used by the printing system. The printing system will access previous versions of the DRFs available on the system allowing the drive to be used and providing backward capability. If a DRF for a deprecated drive is accidentally removed from the system, the generic drive data file can be used and thus provides another mechanism for backward compatibility.

If a drive-specific DRF is available, the printing system will attempt to use the optimized values for a specific media type. If the DRF does not contain the optimized values for a specific media type, the user can use the default generic media values or request a software update to get a DRF with optimized values. By providing generic values, forward compatibility for media types is provided without requiring a software update. Likewise, if a media type is deprecated and no longer supported, the generic media data can be used to provide backward compatibility.

As the LightScribe printing system evolves, new parameters may be added to the DRF, thus changing the data set format. Each DRF is constructed as a collection of format-specific data sets. For example, a DRF may initially contain only one data set. When a format change has occurred, for example to support additional labeling parameters, data in the new format will be appended to the end of the current DRF. When the printing system encounters the data file, it will attempt to read the data in the latest format it understands. If the printing system cannot interpret the latest format included in the DRF, it will traverse the DRF until a data format that the printing system can interpret is found in the DRF. In an example embodiment, the initial data format will always be supported by the LightScribe printing system.

As noted in examples set forth above, parameters (such as labeling parameters) can be organized in drive-specific resource files. This facilitates providing new or updated drive-specific resource files as new drive types or drive firmware is introduced. Alternatively, parameters can be organized in media-specific resource files, with drive-specific data for labeling with a particular media type encoded in the resource file associated with the media type being labeled. This embodiment would be appropriate for a distribution model whereby new or updated media-specific resource files are provided as new media types are introduced. Thus, in an alternate embodiment, "Printer" and "Media" may be swapped in FIG. 2 to show how these media-specific resource files would be used. An another alternate embodiment, parameters are organized in drive- and media-specific resource files, one resource file associated with a specific combination of drive and media type.

In an example embodiment, a printing method includes providing a device (e.g., a printer or a drive) with access to configuration data that can be changed without recompiling printing system software that is used by the device, in conjunction with the configuration data, to perform a printing operation (e.g., a labeling operation). In an example embodiment, the configuration data is device-specific data (e.g., printer-specific data or drive-specific data) that configures the printing system software to operate with the device. In an example embodiment, the configuration data is media-specific data that configures the printing system software to print on a particular type of media usable with the device. In an example embodiment, the configuration data is device- and media-specific data that configures the printing system software to operate with the device and configures the printing system software to print on a particular type of media usable with the device. In an example embodiment, the method further includes changing the configuration data. For example, the configuration data is changed to include an additional data set that is compatible with a new device. In another example embodiment, the configuration data includes multiple data sets that are each compatible with different devices. In another example embodiment, the configuration data includes generic device data that is compatible with multiple different devices.

In an example embodiment, a printing system includes a first processor-executable file having printing system code that receives print data from an application, and a second processor-readable file segregated from the first processor-executable file, the second file having configuration data that configures the printing system software to communicate with a particular type of printing device and enables the printing system code to print the print data on the particular type of printing device. In an example embodiment, the second file can be replaced to support a different type of printing device without recompiling the first file.

In an example embodiment, a printing system includes a first processor-executable file having printing system code that receives print data from an application and prints the print data on a printing device, and a second processor-readable file segregated from the first processor-executable file, the second file including configuration data that configures the printing system software to print the print data on a particular type of print media usable with the printing device. In an example embodiment, the second file can be replaced to support a different type of print media without recompiling the first file.

In a device (e.g., a printer or a drive) configured to perform a printing operation (e.g., a labeling operation) using printing system software and a device- and/or media-specific data file (e.g., including printer-specific data or drive-specific data), an example printing method includes changing the device- and/or media-specific data file without recompiling the printing system software. In an example embodiment, the device- and media-specific data file is changed to include an additional version of data that is compatible with a new device. In an example embodiment, the device- and media-specific data file includes multiple versions of data that are each compatible with different device and media type combinations. In an example embodiment, the device- and media-specific data file includes different combinations of quality settings and media or device types. In an example embodiment, the device- and media-specific data file includes generic device data that is compatible with multiple different devices. In an example embodiment, the device- and media-specific data file includes generic media data that is compatible with multiple different types of media.

Although embodiments of the present disclosure have been described in terms of the example embodiments above, numerous modifications and/or additions to the above-described embodiments would be readily apparent to one skilled in the art. It is intended that the scope of the claimed subject matter extends to all such modifications and/or additions.

What is claimed is:

1. A printing system configuration method, comprising:
    segregating, from processor-executable printing system software that causes printed output to be produced, non-executable configuration data that configures the software to print to at least one of a particular type of printing device and a particular type of print media, wherein the printing system software is incapable of properly printing to the particular type of printing device and the particular type of print media without the configuration data; and
    providing the device with access to the configuration data to enable the device to perform an optical disc labeling operation using the software; and
    the printing system software printing the printed output on the particular type of printing device and the particular type of print media using the configuration data.

2. The method of claim 1, further comprising:
    updating the configuration data without recompiling the printing system software.

3. The method of claim 1, further comprising:
    updating the configuration data to include an additional data set that is compatible with a new device.

4. The method of claim 1, wherein the configuration data includes multiple data sets that are each compatible with different devices.

5. The method of claim 1, wherein the configuration data includes generic device data that is compatible with multiple different devices.

6. The method of claim 1, wherein the configuration data is printer-specific data.

7. The method of claim 1, wherein the configuration data is disc drive-specific data.

8. The method of claim 1, wherein the device is a printer.

9. The method of claim 1, wherein the device is a disc drive.

10. The method of claim 1, wherein properly printing includes printing using parameters optimized for the particular type of printing device and the particular type of print media.

11. A printing method, comprising:
    providing a computing device with access to non-executable configuration data that can be changed without recompiling printing system software that is used by the computing device, in conjunction with the configuration data, to perform an optical disc labeling operation that causes printed output to be produced on a particular type of printing device and a particular type of print media, wherein the computing device is incapable of properly printing to the particular type of printing device and the particular type of print media without the configuration data; and
    the computing device printing the printed output on the particular type of printing device and the particular type of print media using the configuration data.

12. The method of claim 11, wherein the configuration data is printing-device-specific data that configures the printing system software to operate with the printing device.

13. The method of claim 12, wherein the printing-device-specific data are printer-specific data.

14. The method of claim 12, wherein the printing-device-specific data are disc-drive-specific data.

15. The method of claim 11, wherein the configuration data is media-specific data that configures the printing system software to print on a particular type of media usable with the printing device.

16. The method of claim 11, wherein the configuration data is printing-device- and media-specific data that configures the printing system software to operate with the printing device and configures the printing system software to print on a particular type of media usable with the printing device.

17. The method of claim 11, further comprising:
    changing the configuration data.

18. The method of claim 17, wherein the configuration data is changed to include an additional data set that is compatible with a new printing device.

19. The method of claim 11, wherein the configuration data includes multiple data sets that are each compatible with different printing devices.

20. The method of claim 11, wherein the configuration data includes generic printing-device data that is compatible with multiple different printing devices.

21. The method of claim 11, wherein the printing device is a printer.

22. The method of claim 11, wherein the printing device is a disc drive.

23. A printing apparatus, comprising:
    a computing device configured to perform a printing operation using both processor-executable printing system software and a non-executable configuration data file that configures the printing system software to properly operate with at least one of a particular type of printing device or a particular type of print media;
    means for changing the configuration data file so as to allow the printing system software to operate with at least one of a different type of printing device or a different type of print media without recompiling the printing system software, wherein the printing system software is incapable of properly printing to the printing device and the print media without the configuration data; and
    means for selecting one of media-specific data in the configuration data file that enables the printing system software to optimally print to the print media, and generic media data that enables the printing system software to sub-optimally print to the print media.

24. The apparatus of claim 23, wherein the means for changing includes a memory device for storing the configuration data file, the memory device and the printing system software being separately accessible.

25. The apparatus of claim 23, wherein the configuration data file includes the generic media data.

26. The apparatus of claim 23, wherein the printing system software includes the generic media data.

27. A printing apparatus, comprising:
    a computing device configured to perform a printing operation using both processor-executable printing system software and a non-executable configuration data file that configures the printing system software to properly operate with at least one of a particular type of printing device or a particular type of print media;
    means for changing the configuration data file so as to allow the printing system software to operate with at least one of a different type of printing device or a different type of print media without recompiling the printing system software, wherein the printing system software is incapable of properly printing to the printing device and the print media without the configuration data; and means for selecting one of device-specific data in the configuration data file that enables the printing system software to optimally print to the printing device, and generic device data that enables the printing system software to sub-optimally print to the printing device.

28. The apparatus of claim 27, wherein the configuration data file includes the generic device data.

29. The apparatus of claim 27, wherein the printing system software includes the generic device data.

30. A printing apparatus comprising:
one or more storage devices in which are stored printing system software that causes printed output to he produced and non-executable configuration data that configures the software to print to at least one of a particular type of printing device and a particular type of print media, wherein the printing system software is incapable of properly printing to the particular type of printing device and the particular type of print media without the configuration data, the one or more storage devices being configured such that the configuration data is separately accessible from the printing system software; and a computing device configured to access the one or more storage devices and to perform an optical disc labeling operation using both the printing system software and the configuration data.

31. The apparatus of claim 30, wherein the configuration data includes multiple data sets that are each compatible with a specific device, media type, or combination of printing device and print media type.

32. The apparatus of claim 30, wherein the configuration data includes different settings for different combinations of quality settings and print media or printing device types.

33. The apparatus of claim 32, further comprising:
logic configured to select one of printing-device-specific data and generic printing-device data.

34. The apparatus of claim 33, wherein the configuration data includes the generic printing-device data.

35. The apparatus of claim 33, wherein the printing system software includes the generic printing-device data.

36. The apparatus of claim 32, further comprising:
logic configured to select one of media-specific data and generic media data.

37. The apparatus of claim 36, wherein the configuration data includes the generic media data.

38. The apparatus of claim 36, wherein the printing system software includes the generic media data.

39. The apparatus of claim 32, wherein the configuration data includes printer-specific data.

40. The apparatus of claim 32, wherein the configuration data includes disc drive-specific data.

* * * * *